Figure 1:
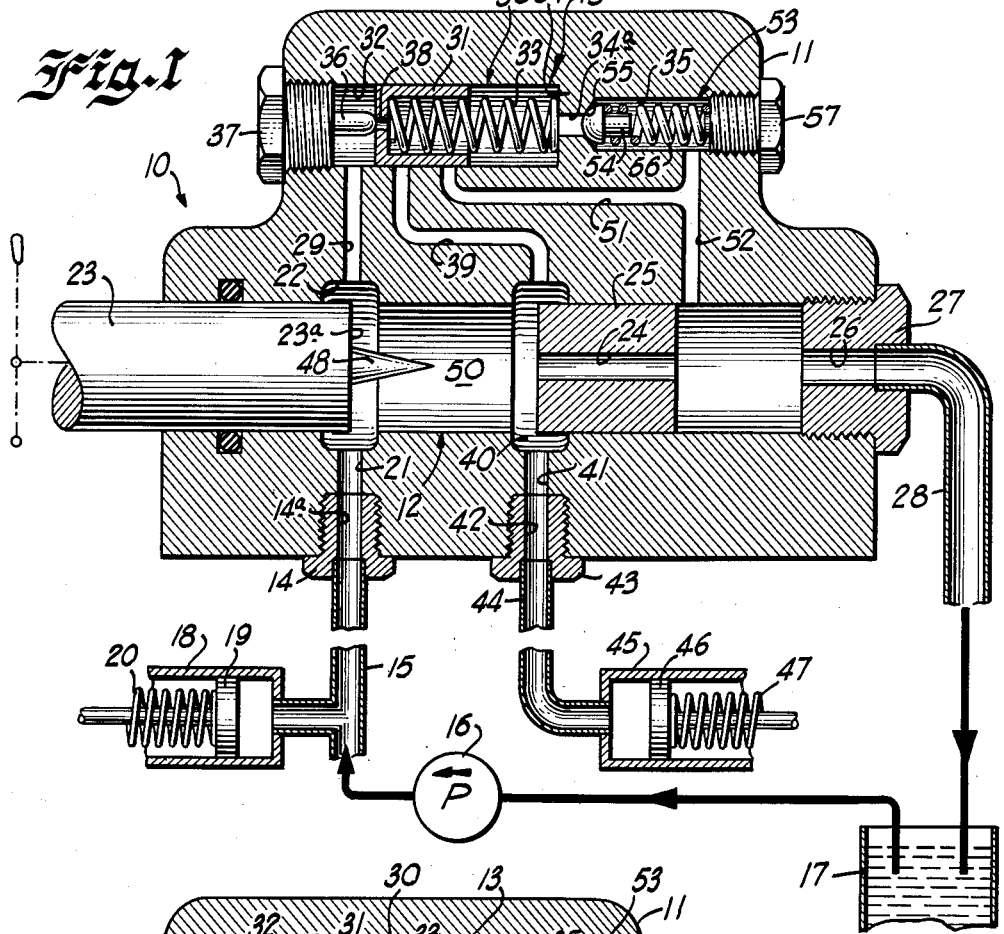

Feb. 13, 1962 W. J. HIPP 3,020,721
CLUTCH AND BRAKE VALVE
Filed May 9, 1960

INVENTOR.
WILLIAM J. HIPP
BY Mason, Kolehmainen,
Rathburn and Wyss
ATTORNEYS.

ǴUnited States Patent Office
3,020,721
Patented Feb. 13, 1962

3,020,721
CLUTCH AND BRAKE VALVE
William J. Hipp, Mount Pleasant, Wis., assignor to Webster Electric Company, Racine, Wis., a corporation of Delaware
Filed May 9, 1960, Ser. No. 27,715
14 Claims. (Cl. 60—97)

The present invention relates generally to a hydraulic valve for controlling a pair of fluid operated devices and is more particularly concerned with a manually operated valve for supplying a predetermined pressure to one portion of a hydraulic system while supplying a variable pressure to a second portion of the system.

While the valve of the present invention is capable of being used in any hydraulic system requiring its operating characteristics, it is especially well suited for use in a hydraulic system for use on tractors employing endless drive treads and, hence, to simplify the ensuing description it will be considered in such an environment. In tractors of the latter type it is conventional to provide an arrangement wherein the drive tread may be disengaged from its drive source, for example, by means of a clutch, in order to remove the vehicle drive during stopping or slowdown. In such systems it is desirable that a braking device, for example, a brake connected to the control steering be operated soon after the drive tread is declutched from its source. It is desirable that these operations take place in sequence in response to movement of a single manually operated control and, hence, one of the primary objects of the present invention is to provide new and improved valving meeting these requirements.

A further object of the present invention is to provide a valve of the type described above which is characterized by simplicity of construction, compactness in arrangement and efficiency of operation.

It is also desirable that during the operation of the braking device the operator experience a reaction or feel on the manually operated control proportional to the pressure of the fluid supplied to the brake and, hence, another object of the invention is to provide a valve including this feature.

The foregoing and other objects are realized, in accordance with the present invention, by providing a manually operated valve which receives inlet fluid from a pump. When the valve is in its neutral position the inlet fluid is bypassed directly to a tank or sump and little or no pressure is built up in the system. The inlet fluid is used to disengage the clutch connected between the drive tread and its source and, hence, with the valve in neutral the latter clutch remains engaged. When it is desired to declutch, the manually operated valve is rendered effective to interrupt the direct bypass to the tank or sump and instead to pass the inlet fluid to a sequence valve. The pressure of the inlet fluid thus builds up until it becomes sufficient to disengage the clutch and to open a relief valve forming part of the sequence valve. When the relief valve opens, fluid flow through an orifice in the valve piston in the sequence valve creates a pressure drop which soon becomes sufficient to move the piston against a light spring. When the latter piston is moved, fluid is passed to the braking device through a fluid path which is connected to the tank or sump through a variable orifice valve controlled by the manually operated valve. When the variable orifice valve is fully open the fluid is bypassed directly to the sump with little or no pressure drop and, hence, under these conditions the pressure of the fluid supplied to the brake is insufficient to operate the latter. When the manually operated valve is moved to restrict the variable orifice, the pressure of the fluid increases until the brake is applied. Since the latter fluid acts on the manually operated valve in a direction tending to return it to the neutral position, the operator experiences a feel or reaction which is proportional to the pressure of this fluid. The sequence valve bypasses any excess pressure of the clutch operating valve as well as the excess pressure of the brake operating fluid.

Figure 2:
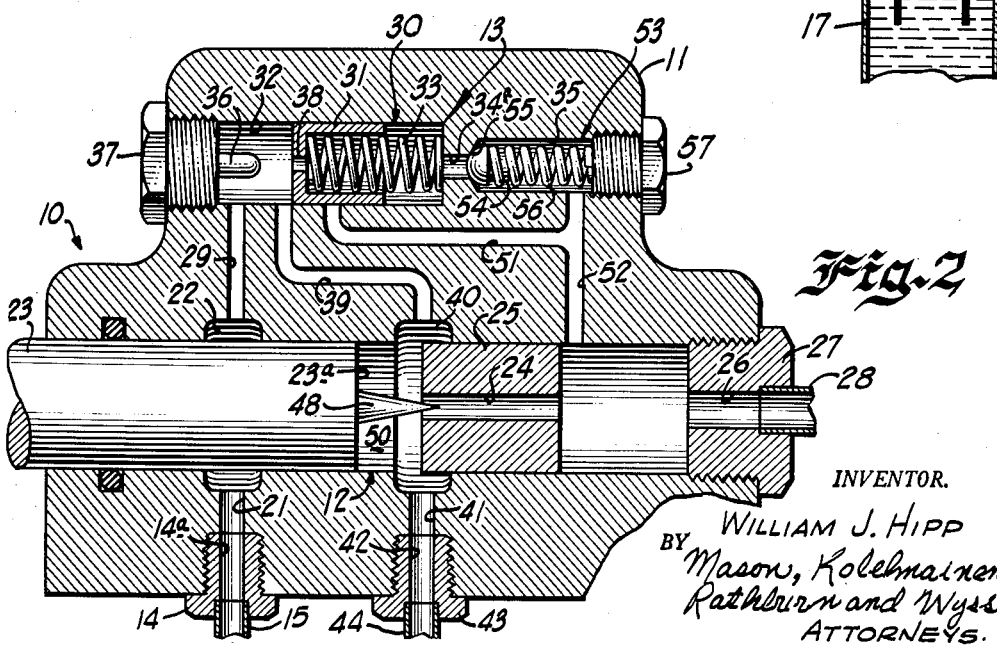

The invention, both as to its organization and method of operation, together with further objects and advantages, will best be understood by reference to the following detailed description taken in conjunction with the accompanying drawing wherein:

FIG. 1 is a cross sectional view of a valve characterized by the features of the present invention with the remaining components of the hydraulic system associated with the valve being shown diagrammatically; and FIG. 2 is a sectional view similar to FIG. 1 but shows the valve in a position wherein it is effective to disengage the clutch and to apply fluid at a variable pressure to the brake.

Referring now to the drawing and first to FIG. 1, a valve characterized by the features of the present invention is there identified generally by the reference numeral 10 and includes a valve body 11 having a pair of valve bores 12 and 13 therein extending parallel to each other. While these bores are illustrated as being formed in a single casing or valve body, it will be understood that they may be formed in separate casings bolted or otherwise secured together. An inlet fitting 14 is threaded into the valve body and is connected via a conduit 15 to the outlet of a pump 16 which has its inlet connected to draw fluid from a sump or reservoir 17. The inlet conduit 15 is also connected directly to a cylinder 18 having a piston 19 therein which, when moved to the left as viewed in FIG. 1, is effective to disengage the clutch (not shown) connected between the drive tread and its drive source. The piston 19 is biased to the right by means of a spring 20 so that the clutch is held engaged until the fluid delivered to the cylinder 18 from the conduit 15 becomes sufficient to overcome the biasing spring. The inlet fitting 14 is provided with a central opening 14a connected through a passage 21 in the valve body to an annular groove 22 communicating with the bore 12.

A valve plunger 23 is slidably mounted within the left end of the bore 12 to control the inlet fluid flow from the groove 22. This plunger is moved within the bore from its neutral position shown in FIG. 1 towards the right by means of a manually operated handle mechanism indicated schematically in the drawing. A sealing gasket seated within an annular recess in the valve body bears against the plunger to prevent leakage therealong. When the valve plunger is in the neutral position, inlet fluid is bypassed to the sump 17 from the groove 22 along a chamber 50 in the bore 12, through a central opening 24 formed in a valve block 25 fixedly mounted within the bore 12, through an opening 26 formed in a bypass fitting 27 threaded into the end of the bore 12 and through a conduit 28 connected to the fitting 27. Since this latter path is substantially unrestricted, the fluid pressure from the pump remains low. Thus, when the plunger 23 is in the neutral position, the pressure of the fluid supplied to the cylinder 18 is very low and is insufficient to overcome the biasing spring 20 with the result that the clutch is engaged.

When it is desired to disengage the clutch the plunger 23 is moved to the right from the neutral position whereupon the chamber 50 is blocked from the annular groove 22 so that the inlet fluid can no longer flow along the bore 12 to the valve block 25. Instead this fluid is diverted through a passage 29 formed in the valve body to a sequence valve generally indicated by the reference numeral 30 and mounted within the bore 13. More specifically, the sequence valve includes a valve piston 31 mounted for sliding movement within an enlarged diameter portion 32 of the bore 13 and biased towards the left by a spring 33. The latter spring has one end nested within the piston 31 and has its other end seated against a shoulder 34 defined between the enlarged diameter portion 32 and a smaller diameter portion 35 of the bore 13. The shoulder 34 has a passageway 34a extending therethrough and communicating with the chamber for the spring 33. Leftward movement of the piston 31 is limited by engagement with an inwardly projecting stop pin 36 formed on a plug 37 threaded into the left end of the bore 13. An orifice 38 in the piston 31 provides continuous communication between the passage 29 and the chamber housing the spring 33 since this orifice is so positioned that it is not blocked by the stop pin 36 when the piston 31 is seated thereagainst, that is, the pin is eccentrically positioned on the plug 37 while the orifice 38 is formed in the center of the head of the piston 31. Thus, the pin 36 is located behind the plane of the paper as viewed in FIGS. 1 and 2. The sequence valve 30 further includes relief or bypass valve 53 mounted within the reduced diameter portion 35 of the bore 13. The latter valve is of the poppet type and includes a valve element 54 normally seated against a tapered valve seat 55 formed on the shoulder 34, the seating being accomplished by means of a coil spring 56 having one end encircling the stem of the valve element 54 and having its other end seated against a plug 57 threaded into the right end of the bore 13 as viewed in FIG. 1. The spring 56 is considerably heavier than the biasing spring 33 acting against the piston 31. The pressure relief valve 53 functions in conventional manner since its valve element 54 is unseated in response to excess pressure of the fluid in the chamber containing the spring 33 and when unseated it diverts excess fluid to the reservoir 17 through the passage 34a, through the passageway 52, through the opening 26 in the bypass fitting 27 and through the conduit 28.

When the valve plunger 23 is moved towards its operating range shown in FIG. 2 to block the flow of inlet fluid from the groove 22 to the chamber 50, the pressure of the fluid in the passage 29, as viewed in FIG. 1, builds up until it reaches a value sufficient to move the piston 19 in order to disengage the clutch. At the same time the pressure of the fluid in the chamber for the spring 33 builds up until it reaches a level sufficient to overcome the spring 56 and move the poppet valve element 54 to the right. The strength of the spring 56 is such that the poppet valve element does not unseat until the clutch has been disengaged. When the valve element 54 is unseated the chamber for the spring 33 is connected to the tank 17 in the manner described above and fluid flows from the passage 29 through the orifice 38. When the pressure drop across the orifice becomes sufficient, the piston 31 is moved to the right against the relatively light spring 33.

Movement of the piston 31 to the right in response to the pressure drop across the orifice 38 connects the passage 29 to a passage 39 in the valve body leading to an annular groove 40 communicating with a chamber 50 in the bore 12 formed between the valve block 25 and the inner face 23a of the plunger 23. The groove 40 is connected to the sump through the opening 24 in the valve block 25, through the opening 26 in the bypass fitting 27 and through the conduit 28. The groove 40 is also connected through a passage 41 in the valve body, through a central bore 42 defined in an outlet fitting 43 threaded into the valve body and through an outlet pipe or conduit 44 connected to the fitting 43 to a brake operating cylinder 45. At this time, the flow through the orifice 38 is just sufficient to maintain a balanced condition so that the piston 31 remains in a position where the passage 39 is uncovered and the pressure of the fluid acting on the clutch piston 19 is sufficient to maintain the clutch engaged. The poppet valve 54 is opened slightly to permit the flow of an amount of fluid through the orifice 38 sufficient to sustain the balanced condition at the piston 31. A piston 46 within the cylinder 45 is biased to the left by a spring 47 in order to maintain the brake disengaged and this piston is moved to the right only when the pressure of the fluid admitted to the cylinder 45 overcomes the spring 47. The pressure of the latter fluid is increased when the manually operated plunger 23 is moved to the right sufficiently to permit a needle 48 secured to the right face of the plunger to enter the opening 24 in the valve block 25. Specifically, the needle 48 and the opening 24 cooperate to form a variable orifice for restricting the path for bypass fluid from the chamber 50. Thus, when the needle 48 begins to close the opening 24, that is, when the plunger moves to the position shown in FIG. 2, the bypass fluid path is restricted and the pressure of the fluid in the chamber 50 increases in direct proportion to the restriction or, more particularly, to the rightward movement of the plunger 23. When the plunger reaches a predetermined point in its movement, the pressure of the fluid supplied to the cylinder 45 becomes sufficient to overcome the spring 47 in order to apply the brake.

In the event that the opening 24 is completely blocked by the needle 48, the sequence valve 30 functions as a pressure relief valve. To this end, any excess pressure of the fluid in the chamber 50 is also present in the chamber for the spring 33 and, hence, further unseats the poppet valve element 54 to increase the fluid flow through the orifice 38. The increased pressure drop across the latter orifice results in further movement of the sequence valve piston 31 to the right until it reaches a position where the passage 29 is connected directly to another passage 51 formed in the valve body, thereby by-passing excess fluid to the sump 17 through the passage 51, through the connecting passage 52, through the opening 26 in the bypass fitting 27 and through the conduit 28. The excess pressure of the brake operating fluid is thus relieved through the passages 51 and 52. If at any time during the operation of the sequence valve, the pressure of the clutch operating fluid becomes excessive, the poppet valve is opened further in order to bypass the excess fluid through the passage 52.

The pressure of the fluid in the chamber 50 acts against the face 23a of the plunger 23 and, hence, resists the manual movement of the plunger. The resistance offered is directly proportional to the pressure of the fluid supplied to the brake operating cylinder 45 and, since it acts in a direction tending to return the plunger to the neutral position shown in FIG. 1, the operator experiences a reaction or feel which permits greater accuracy of control.

With the clutch disengaged and the brake applied, the reverse sequence of operation may be achieved by moving the plunger 23 to the left as viewed in FIG. 2. This movement causes a greater amount of fluid to flow to the tank 17 through the variable orifice formed between the needle 48 and the opening 24 and, thus causes a drop in the pressure of the fluid in the chamber 50. This pressure drop results in movement of the valve element 54 towards its closed position until the fluid flow through the latter valve reaches a level to sustain the balanced condition described above, and, hence, it can be seen that the relief valve 53 does not at this time close completely. The partial closing of the relief valve 53 decreases the rate of fluid flow through the orifice 38 and, hence, results in movement of the piston 33 towards the left to cover the passage 39. The pressure drop in the chamber 50 also results in disengagement of the brake as soon as this pressure decreases to a level where it is no longer capable of resisting the spring 47. If the plunger 23 is moved further to the left to permit fluid flow from the groove 22 directly to the chamber 50, the fluid pressure applied to the cylinder becomes insufficient to resist the spring 20 and the clutch is thus engaged. The drive for the tractor has now been recompleted.

In view of the foregoing description it will be observed that the structure described is effective to accomplish all of the enumerated objects of the invention. The valve provided is of very simple construction and the parts are compactly arranged while at the same time permitting the application of a variable pressure and a predetermined pressure to different portions of the system by operating a single manual control.

While the present invention has been described in connection with the details of a particular embodiment thereof, it should be understood that these details are not intended to be limitative of the invention since many modifications will be readily apparent to those skilled in this art and it is, therefore, contemplated in the accompanying claims to cover any such modifications as fall within the true spirit and scope of the invention.

What is claimed as new and desired to be secured by Letters Patent of the United States is:

1. Control valving for use in a hydraulic system to direct fluid under a predetermined pressure to a first fluid operated device and to direct variable pressure fluid to a second fluid operated device, said valving including valve body means defining first and second valve bores, a manually operated plunger mounted for sliding movement within the first bore from a neutral position to an operating position, an inlet port communicating with said valve bore and with the first fluid operated device to deliver inlet fluid, a first passage connecting said inlet port to conduct fluid to said second bore independently of the position of said plunger, a valve piston including means defining a restricted flow path and mounted for movement in said second bore by the fluid delivered through said first passage in sequence from a first position to a second position and then to a third position, a spring biasing said piston towards said first position, a second passage in said valve body means spaced from the first passage and connecting said second bore to a portion of said first bore downstream from the inlet port, a relief valve communicating with said second bore downstream from said second passage, means forming a bypass opening leading from said portion of said first bore, a bypass connected to receive fluid from said opening, a valve element on said plunger cooperating with said opening to form a variable orifice for restricting the flow of fluid through the opening as a function of the position of the plunger, means connecting said portion of said first bore to said second fluid operated device, a third passage spaced downstream from the first and second passages and connecting said second bore to said bypass independently of said variable orifice, said inlet port being connected directly to said portion of said first bore and to said bypass through said opening when said plunger is in said neutral position at which time the opening is unrestricted by said valve element, said inlet port being blocked from said portion of said first bore by said plunger when the latter is moved to its operating position, thereby to cause a buildup in pressure of the fluid conducted through said first passage to the second bore until the pressure becomes sufficient to operate said relief valve and, hence, to increase the fluid flow through the restricted flow path, the pressure drop across said path being effective to move said piston from its first position towards its second position, said piston when in its second position being effective to connect said second passage to said first passage through said second bore, thereby to supply pressure fluid to said portion of said first bore, the pressure of the latter fluid being a function of the restriction in said bypass provided by said variable orifice so that the pressure of the fluid supplied to the second fluid operated device is a function of the position of the plunger, and said piston when in said third position being effective to connect said first passage to said third passage in order to bypass fluid from the first passage independently of said variable orifice.

2. The valving defined by claim 1 wherein the restricted flow path is provided by an orifice in the piston communicating fluid from the first passage to the pressure relief valve, and means connecting said pressure relief valve to the bypass independently of said variable orifice in order to bypass excess fluid from the first passage when the relief valve is opened.

3. The apparatus defined by claim 1 wherein the inner end of the plunger extending into said first bore is exposed to the fluid in said portion of said first bore, thereby to provide a force opposing movement of the plunger, the latter force being a function of the size of said orifice.

4. Control valving for use in a hydraulic system to direct fluid under a predetermined pressure to a first fluid operated device and to direct variable pressure fluid to a second fluid operated device, said valving including valve body means defining first and second valve bores, a manually operated plunger mounted for sliding movement within the first bore from a neutral position to an operating position, an inlet port communicating with said valve bore and with the first fluid operated device to deliver inlet fluid, a first passage connecting said inlet port to conduct fluid to said second bore independently of the position of said plunger, a valve piston including means defining a restricted flow path therethrough and mounted for movement in said second bore from a first position to a second position in response to the fluid flow from said first passage through said flow path, a relief valve communicating with the second bore downstream from the restricted path for controlling the fluid flow through the restricted path, a second passage in said valve body means spaced from the first passage and connecting said second bore to a portion of said first bore downstream from the inlet port, means forming a bypass opening leading from said portion of said first bore, a bypass connected to receive fluid from said opening, a valve element on said plunger cooperating with said opening to form a variable orifice for restricting the flow of fluid through the opening as a function of the position of the plunger, means connecting said portion of said first bore to said second fluid operated device, said inlet port being connected directly to said portion of said first bore and to said bypass through said opening when said plunger is in said neutral position at which time the opening is unrestricted by said valve element, said inlet port being blocked from said portion of said first bore by said plunger when the latter is moved to its operating position, thereby to cause a buildup in pressure of the fluid conducted through said first passage to the second bore until the pressure becomes sufficient to operate said relief valve to increase the fluid flow through the restricted path and, hence, to move said piston from its first position towards its second position, and said piston when in its second position being effective to connect said second passage to said first passage through said second bore, thereby to supply pressure fluid to said portion of said first bore, the pressure of the latter fluid being a function of the restriction in said bypass provided by said variable orifice so that the pressure of the fluid supplied to the second fluid operated device is a function of the position of the plunger.

5. The valving defined by claim 4 wherein the restricted flow path is provided by an orifice in said piston communicating fluid from the first passage to the pressure relief valve, and means connecting said pressure relief valve to the bypass independently of said variable orifice in order to bypass excess fluid from the first passage when the relief valve is opened.

6. The apparatus defined by claim 4 wherein the inner end of the plunger extending into said first bore is exposed to the fluid in said portion of said first bore, thereby to provide a force opposing movement of the plunger, the latter force being a function of the size of said orifice.

7. Control valving for use in a hydraulic system to direct fluid under a predetermined pressure to a first fluid operated device and to direct variable pressure fluid to a second fluid operated device, said valving including valve body means defining a valve bore, a manually operated valve member mounted for movement within the valve bore from a neutral position to an operating position, an inlet port communicating with said valve bore and with the first fluid operated device to conduct inlet fluid, a sequence valve receiving fluid from said inlet port and including a valve control member movable in response to the latter fluid in sequence from a first position to a second position and then to a third position, a passage connecting said sequence valve to a portion of said bore spaced from the inlet port and to the second fluid operated device, means forming a variable orifice providing a path for bypassing fluid from said portion of said bore with the size of said orifice being controlled by movement of the valve member when the latter is in its operating position, said inlet port being connected directly to said portion of said valve bore and to said orifice when said valve member is in its neutral position, said inlet port being blocked from said portion of said first bore by said valve member when the latter is moved to its operating position, thereby to divert fluid to the sequence valve to move said valve control member from its first position towards its second and third positions, said valve control member in its second position being effective to connect said inlet port to said portion of said bore, the pressure of the latter fluid being a function of the restriction provided by said variable orifice so that the pressure of the fluid conducted to the second fluid operated device is a function of the position of the valve member, and means effective when said valve control member is in said third position for connecting said inlet port to bypass fluid independently of said variable orifice.

8. The apparatus defined by claim 7 wherein there is additionally provided means responsive to the pressure conducted to the second fluid operated device for opposing movement of the manually operated valve member.

9. The valving defined by claim 7 wherein the valve control member is provided with an opening therein communicating fluid from the inlet port to a pressure relief valve, and means connecting said pressure relief valve to bypass fluid from the inlet port independently of said variable orifice when the relief valve is opened.

10. Control valving for use in a hydraulic system to direct fluid under a predetermined pressure to a first fluid operated device and to direct variable pressure fluid to a second fluid operated device, said valving including valve body means defining a valve bore, a manually operated valve member mounted for movement within the valve bore from a neutral position to an operating position, an inlet port communicating with said valve bore and with the first fluid operated device to conduct inlet fluid, a sequence valve receiving fluid from said inlet port and including a valve control member movable in response to the latter fluid from a first position to a second position, a passage connecting said sequence valve to a portion of said bore spaced from the inlet port and to the second fluid operated device, and means forming a variable orifice providing a path for bypassing fluid from said portion of said bore with the size of said orifice being controlled by movement of the valve member when the latter is in its operating position, said inlet port being connected directly to said portion of said valve bore and to said orifice when said valve member is in its neutral position, said inlet port being blocked from said portion of said first bore by said valve member when the latter is moved to its operating position, whereby with the inlet port blocked from said bore portion fluid is conducted to the sequence valve to move said valve control member from its first position to its second position, said valve control member in its second position being effective to connect said inlet port to said portion of said bore, the pressure of the latter fluid being a function of the restriction provided by said variable orifice so that the pressure of the fluid conducted to the second fluid operated device is a function of the position of the valve member.

11. Control valving for use in a hydraulic system to direct fluid under a predetermined pressure to a first fluid operated device and to direct variable pressure fluid to a second fluid operated device, said valving including valve body means defining a valve bore, a manually operated valve movable in said bore from a neutral position to an operating position, an inlet port communicating with said valve bore and with the first fluid operated device to deliver inlet fluid, means including a sequence valve for conducting fluid from the inlet port to the second fluid operated device, the latter means also including structure defining an orifice the size of which is varied by movement of the manually operated valve when the latter is in its operating position, said manually operated valve and said sequence valve being constructed and arranged to prevent the buildup of pressure in fluid directed to said first and second devices when said manually operated valve is in neutral position and, when said manually operated valve is in its operating position to direct fluid under predetermined pressure to the first fluid operated device and to direct to the second fluid operated device a variable pressure controlled by the size of said orifice.

12. Control valving for use in a hydraulic system to direct fluid under a predetermined pressure to a first fluid operated device and to direct variable pressure fluid to a second fluid operated device, said valving including valve body means defining a valve bore, a manually operated valve movable in said bore from a neutral position to an operating position, an inlet port communicating with said valve bore and with the first fluid operated device to deliver inlet fluid, means including a sequence valve for conducting fluid from the inlet port to the second fluid operated device, the latter means also including structure defining an orifice the size of which is varied by movement of the manually operated valve when the latter is in its operating position, said manually operated valve and said sequence valve being constructed and arranged to prevent the buildup of pressure in fluid directed to said first and second devices when said manually operated valve is in neutral position and, when said manually operated valve is in its operating position, to direct fluid under predetermined pressure to the first fluid operated device and to direct to the second fluid operated device a variable pressure controlled by the size of said orifice, and means responsive to said variable pressure for opposing movement of said manually operated valve.

13. Control valving for use in a hydraulic system to direct fluid under a predetermined pressure to a first fluid operated device and to direct variable pressure fluid to a second fluid operated device, said valving including a manually operated valve piston movable in sequence within a valve bore from a neutral position through a first operating range and then by continued movement in the same direction through a second operating range, said valving including means effective when said valve is moved through the first range to conduct fluid under a predetermined pressure to said first fluid operated device and operable when said valve is moved through said second range to conduct said fluid under said predetermined pressure to said first fluid operated device and, at the same time, to conduct to said second fluid operated device fluid having a pressure which varies in accordance with the position of said valve piston.

14. Control valving for use in a hydraulic system to direct fluid under a predetermined pressure to a first fluid operated device and to direct variable pressure fluid to a second fluid operated device, said valving including a manually operated valve piston movable in sequence within a valve bore from a neutral position through a first operating range and then by continued movement in the same direction through a second operating range, said valving including means effective when said valve is moved through the first range to conduct fluid under a predetermined pressure to said first operated device and operable when said valve is moved through said second range to conduct said fluid under said predetermined pressure to said first fluid operated device and, at the same time, to conduct to said second fluid operated device fluid having a pressure which varies in accordance with the position of said valve piston, and means for conducting the variable pressure to said bore to act against said piston in order to oppose manual movement of the valve piston through the second range.

References Cited in the file of this patent

UNITED STATES PATENTS 2,725,890     Kanuch _____ Dec. 6, 1955

FOREIGN PATENTS 871,172     France _____ Jan. 10, 1942